June 16, 1931. H. KRUEGER 1,810,771
COMBINATION SHADE AND SHUTTER WITH AUTOMATIC LOCKING MEANS
Filed May 15, 1930 3 Sheets-Sheet 1
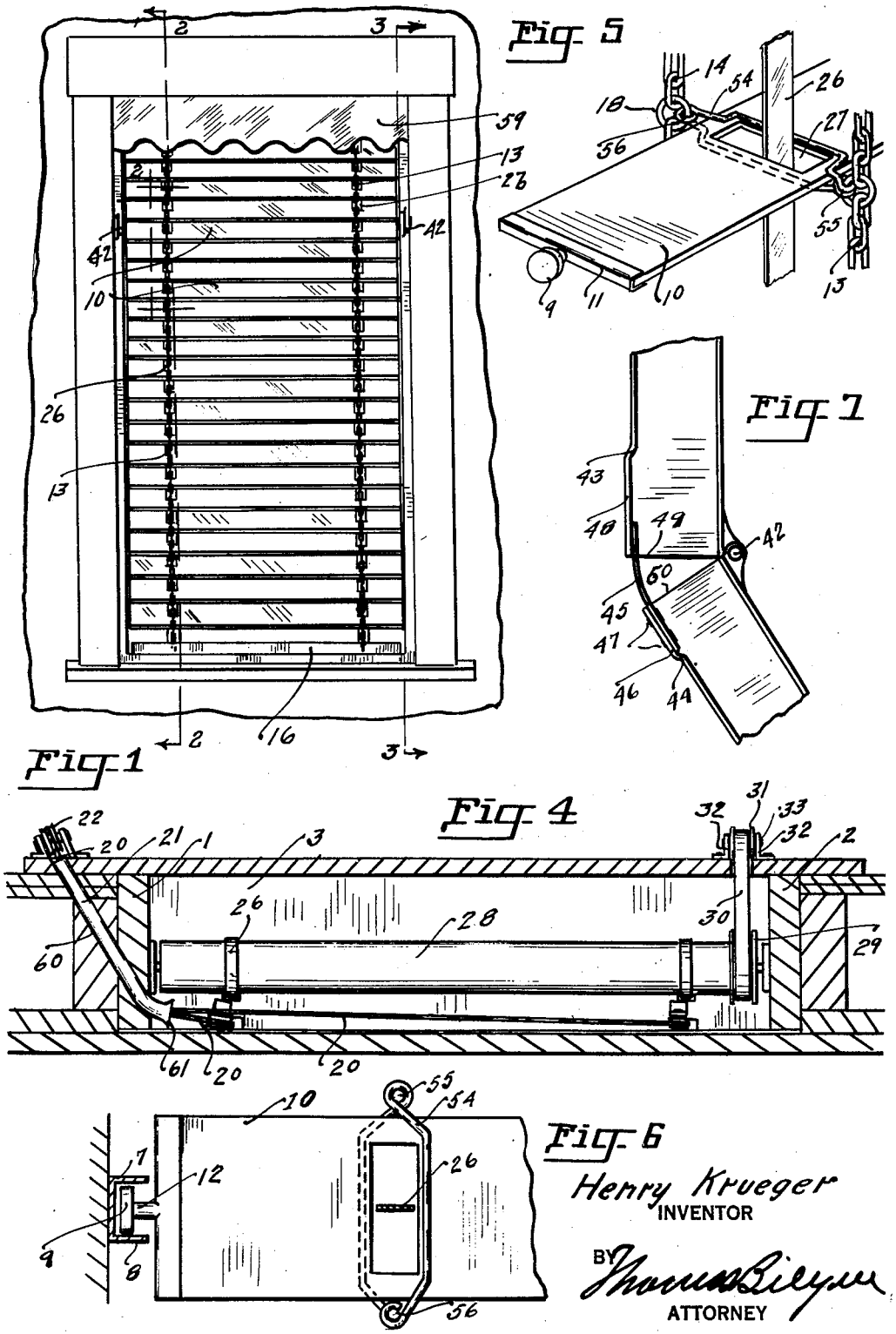
Henry Krueger
INVENTOR
ATTORNEY

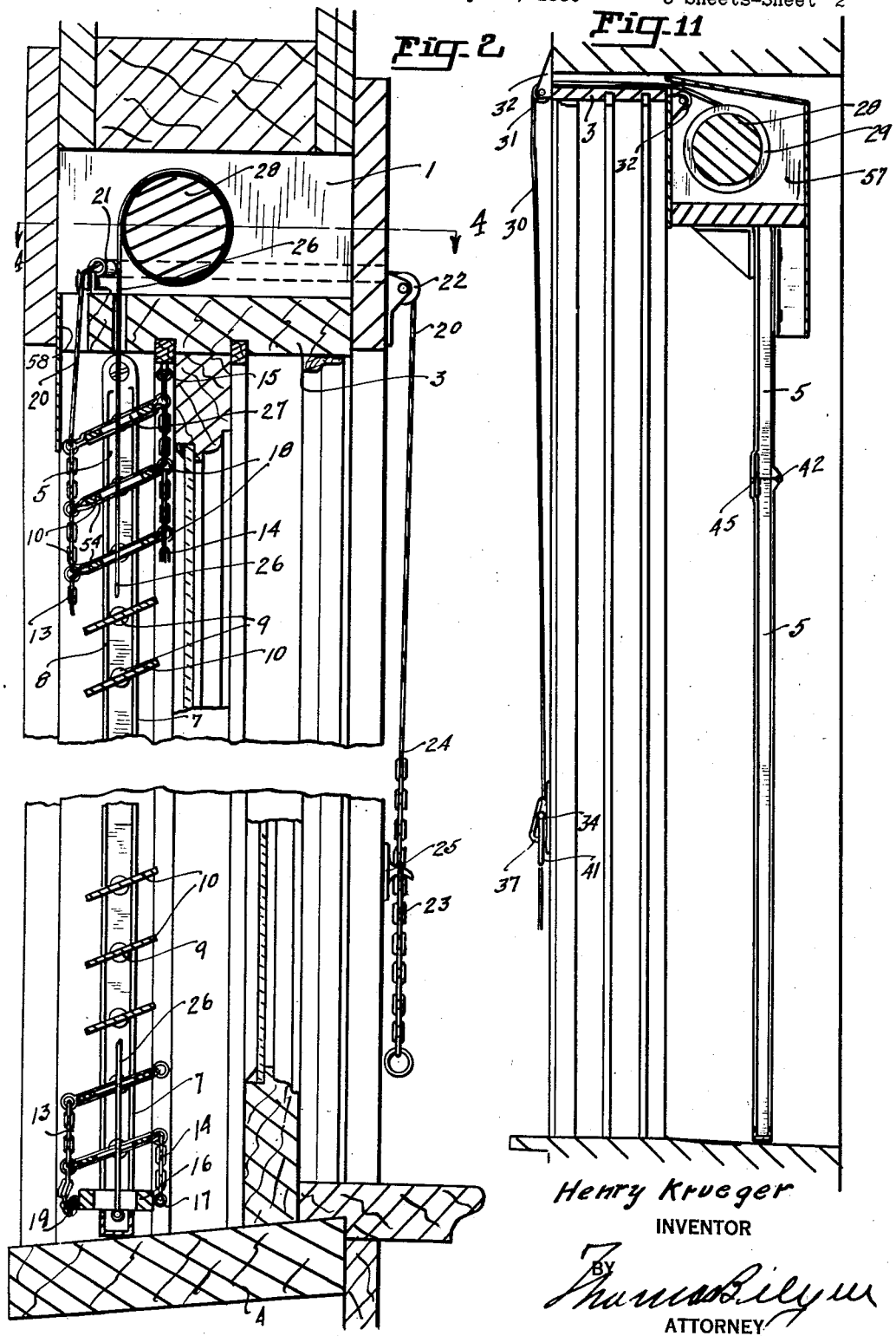

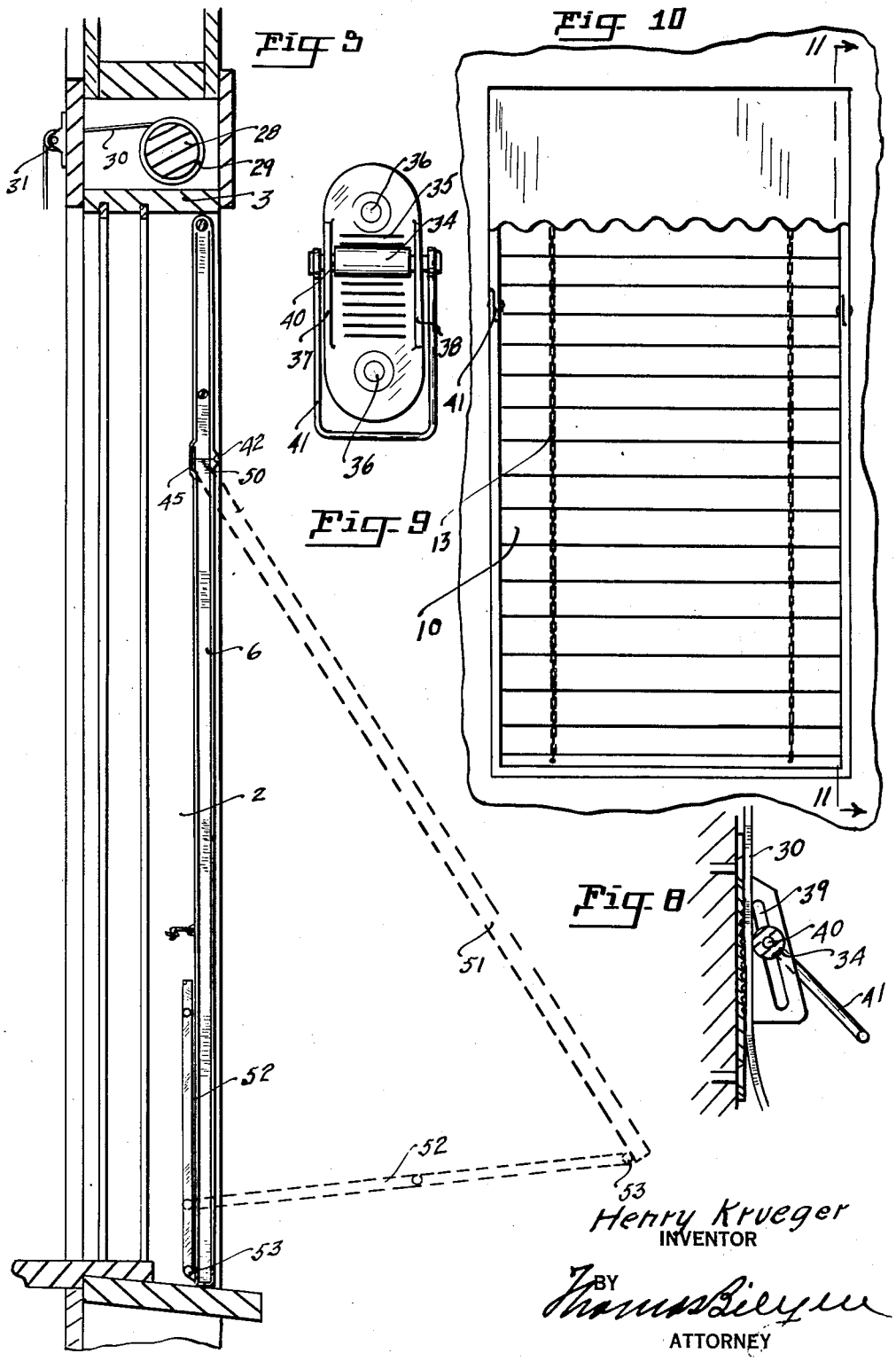

Patented June 16, 1931

1,810,771

UNITED STATES PATENT OFFICE

HENRY KRUEGER, OF SPOKANE, WASHINGTON

COMBINATION SHADE AND SHUTTER WITH AUTOMATIC LOCKING MEANS

Application filed May 15, 1930. Serial No. 452,684.

My invention is primarily intended as an adjustable shutter for use upon windows, the same being primarily adapted for placement on the outside of the building and on the outside of the window opening with means being provided for using the same as a shutter for the prevention of the direct sun rays entering the room and at the same time having means provided for the inclining of a substantial portion of the shade or shutter at an angle to the vertical about a hinged joint. Means are provided for the raising and lowering of the shutter from the inside of the building and for the adjusting of the inclination of the shutter elements from the interior of the building.

The primary object of my invention is for placement on the exterior of the building for regulating the amount of air and light that may be passed through the opening when the window is opened.

A still further object of my invention consists in providing a shutter element that may be placed within and removed from a window opening and that may be adjusted for regulating the amount of air and light that may be permitted to pass through the opening, or that may be inclined outward at an angle to the vertical for permitting a relatively free passage of air through the opening but that will prevent the direct passage of light rays through the opening.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of the assembled device shown in place in a window opening and illustrating the same as being in position upon the outside of the building.

Fig. 2 is a fragmentary, sectional, side elevation of the assembled device, the same being taken on line 2—2 of Fig. 1, looking in the direction indicated.

Fig. 3 is a sectional, side view of the assembled device, the same being made to illustrate the inclination of a substantial portion of the device to the vertical.

Fig. 4 is a top, plan view of the assembled device.

Fig. 5 is a fragmentary, perspective, end view of one of the shutter elements.

Fig. 6 is a fragmentary, top plan view of one of the shutter elements illustrating one end of the shutter, as in place within the guideway of the side wall of the frame.

Fig. 7 is a fragmentary, sectional, side view of the shutter assembly made at the hinged joint. The hinged joint is made to facilitate the inclination of one end of the shutter to the vertical.

Fig. 8 is a side view of the lock for maintaining the adjusting strap in desired placement.

Fig. 9 is a front view of the mechanism illustrated in Fig. 8.

Fig. 10 is a front view of the assembled device shown in place within the window and illustrating the shutter as being entirely closed to prevent the passage of light therethrough.

Fig. 11 is a sectional, side view of the assembled device, the same being taken on line 11—11 of Fig. 10, looking in the direction indicated.

Like reference characters refer to like parts throughout the several views.

I preferably form my device comprised of a frame having side wall members 1 and 2 and having end members 3 and 4, the same being so made that it is adapted for placement within the window opening of any building. Guideways 5 and 6 are disposed upon the inside of the side wall members. These guideways have side walls 7 and 8 that are spaced apart. The side walls 7 and 8 should be sufficiently spaced apart and of sufficient depth to afford rigidity to the guideway and so far spaced apart as to permit a head 9, as illustrated in Fig. 6, to function therein and therebetween. Each of the shade forming elements 10 are preferably made of light material, as pine lumber, and each shade element has a head 11, as illustrated in Fig. 6, disposed upon each end of the shade element. A shank 12 outwardly extends from the head 11 and a head 9 is disposed thereon that is adapted for being guided within the side walls 7 and 8 of the guideway. The spaced shade forming elements 10 are supported upon oppositely disposed sides by any suitable flexible means as by chains 13 and 14. Each of the chains 14 are secured upon their one end to any suitable fastening means as to eye-bolts or hooks 15 and on their oppositely disposed ends to the movable sill 16. The connection is made therewith between the two by any suitable fastening means as by eye-bolts 17. The shade forming elements are fixedly positioned to the chains 14 as by stirrups 54 that are equally spaced along the chains 14. The chains 15 are secured upon their one end to the eye-bolts 19 and upon their oppositely disposed ends to a flexible band 20. The band 20 passes over, or through a guideway 21, and over a pulley 22 to the inside of the building. Any suitable locking means as a chain 23 terminates the free end 24 of the flexible element 20 and the flexible pull 20 is in registerable alignment with a supporting or locking hook 25 that is disposed in normal registerable alignment with the end 23 of the flexible element 20. The normal position of the shade forming elements 10 is that of being substantially in horizontal spaced alignment. When it is desired, for any reason to lessen the distance between the shade forming elements to permit, or restrict, the passage of the light rays therethrough, the normal position of the shade forming elements may be changed to that of the desired angle by the adjustment of the pull chain 23. Flexible bands 26 are secured upon their one end to the sill 16 and pass centrally through a slot 27. Two or more of these flexible bands are used depending upon the width of the opening in which the device is to be used. A winding drum 28 is disposed within the top of the frame about which the flexible bands are wound. A shrouded pulley 29 is fixedly positioned relative to the drum 28 and a strap 30 passes about the shrouded pulley 29 and passes over a pulley 31. One end of the strap 30 is secured to the pulley 29 so that when the strap is pulled the pulley 29 and the drum 28 are simultaneously rotated. The shaft 33 upon which the pulley 31 is journaled within the supporting brackets 32 is disposed upon the oppositely disposed end of the shaft 31. The strap 30 passes between the roller 34 and the corrugated base 35. The corrugated base 35 is adapted for being fixedly positioned upon the frame of the opening and is secured thereto by any suitable fastening means as by screws being passed through the fastening holes 36. Ears 37 and 38 are upturned at either side of the base 35 and slots 39 are disposed within each of the ears. The roller 34 has a shaft 40 disposed therein that is adapted for being placed within the slots and an actuating bail 41 is secured to the shaft. When it is desired to raise the movable sill 16 and all, or a part, of the shade forming elements, the drum 28 is rotated by the pulling of the strap until the desired height of the movable sill 16 is obtained at which time the roller 34 is passed downward along the slots until the strap is held between the roller and the corrugated surfaces of the base 35 in which position the same is held until released.

The side walls 1 and 2 are formed of two independent side wall elements as illustrated in Fig. 7 with the independent elements being hingedly secured together by any suitable fastening means as by a hinged joint 42. Offsets 43 and 44 are formed within the side walls of the respective adjacent elements and a flexible spring 45 is secured to one of the offset surfaces 46 by rivets 47. The free end of the spring engages upon the offset portion 48 to prevent the forming of a gap between the respective ends 49 and 50 of the side frames. This permits of a relatively free movement of the shade forming elements and at the same time maintains the same in substantial alignment and in uniform spaced relationship with each other. The free end of the frame may be outwardly swung, as illustrated at 51 in Fig. 3, and the same may be maintained in placement by a strut 52 that is hingedly secured to the lower end of the frame, as illustrated at 53 in Fig. 3. Stirrups 54, as illustrated in Fig. 6, may be made endless and fixedly positioned upon the shade forming elements 10 to form eyes 55 and 56 in the oppositely disposed end of the stirrups to which the adjusting chains 13 and 14 may be secured. A housing 57, as illustrated in Fig. 11, may be placed at the top of the device into which the roller or drum 28 is positioned and a shield 58 having an ornamental lower edge 59 is placed adjacent the housing 57. The same should be sufficiently wide to properly protect the entire shade assembly when the same has been raised to its greatest height to prevent the free admission of snow and rain within the assembly. To facilitate the installation of the device within the walls, frame, or structure upon which my device is to be installed, I have found that the raising and lowering elements of the shade may be passed through a tube 60 as illustrated in Fig. 4. If the tube has an enlarged end 61 the same offers less resistance to the passing of the raising and lowering lines therethrough.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a frame, a guideway disposed upon the inner surface of each of the side walls of the frame, a plurality of shade forming elements disposed in spaced relationship with each other, each of which has a head fixedly positioned upon each end of the shade forming elements, a shank outwardly extending from each of the heads and a head disposed upon the outer end thereof that is adapted for placement within the guideways, two or more flexible elements fixedly secured upon their respective ends to supporting elements and secured to one of the side walls of each of the shade forming elements adapted for maintaining the shade forming elements in equal spaced relationship, along one side of each of the shade forming elements, a flexible member fixedly secured on its one end to a removable sill and to the oppositely disposed side wall of the shade forming elements to normally maintain the shade forming elements in equal spaced relationship to the oppositely disposed side of the shade forming elements and means for moving and fixedly positioning a manipulative element for predetermining the spaced relationship and the angle of inclination of each of the shade forming elements and independent means for raising the movable sill and each of the shade forming elements, one at a time, from the bottom upward.

2. In a device of the class described, the combination of a frame, a movable sill suspended within the frame by flexible elements, a plurality of shade forming elements, one side of each of which are secured to a depending flexible element from the frame, the oppositely disposed sides of each of the shade forming elements being secured to a movable flexible element, means for positioning the movable flexible element for predetermining the spaced relationship between the shade forming elements and for predetermining the angle of repose of each of the shade forming elements and means for raising the assembly of shade forming elements from the bottom upward, said means consisting of a flexible band secured to the movable sill passing centrally through each of the shade forming elements and passing around a winding drum, and hand manipulative means for rotating the drum and for fixedly positioning the drum in placement.

3. In a device of the class described, the combination of a frame, guideways disposed within the side walls of the frame, a plurality of shade forming elements the ends of which are adapted for being actuated within the guideways, flexible means for maintaining the spaced relationship of one side of each of the shade forming elements in relatively fixed spaced relationship, and hand manipulative supporting means disposed upon the oppositely disposed side of the shade forming element for predetermining the angle of repose of each of the shade forming elements, a movable sill depending from the base of the shade forming assembly, a flexible supporting element secured to the base upon its one end and passing about a winding drum and being fixedly secured thereto, and hand manipulative means for rotating the drum and fixedly locking the same in placement.

HENRY KRUEGER.